Figure 1:
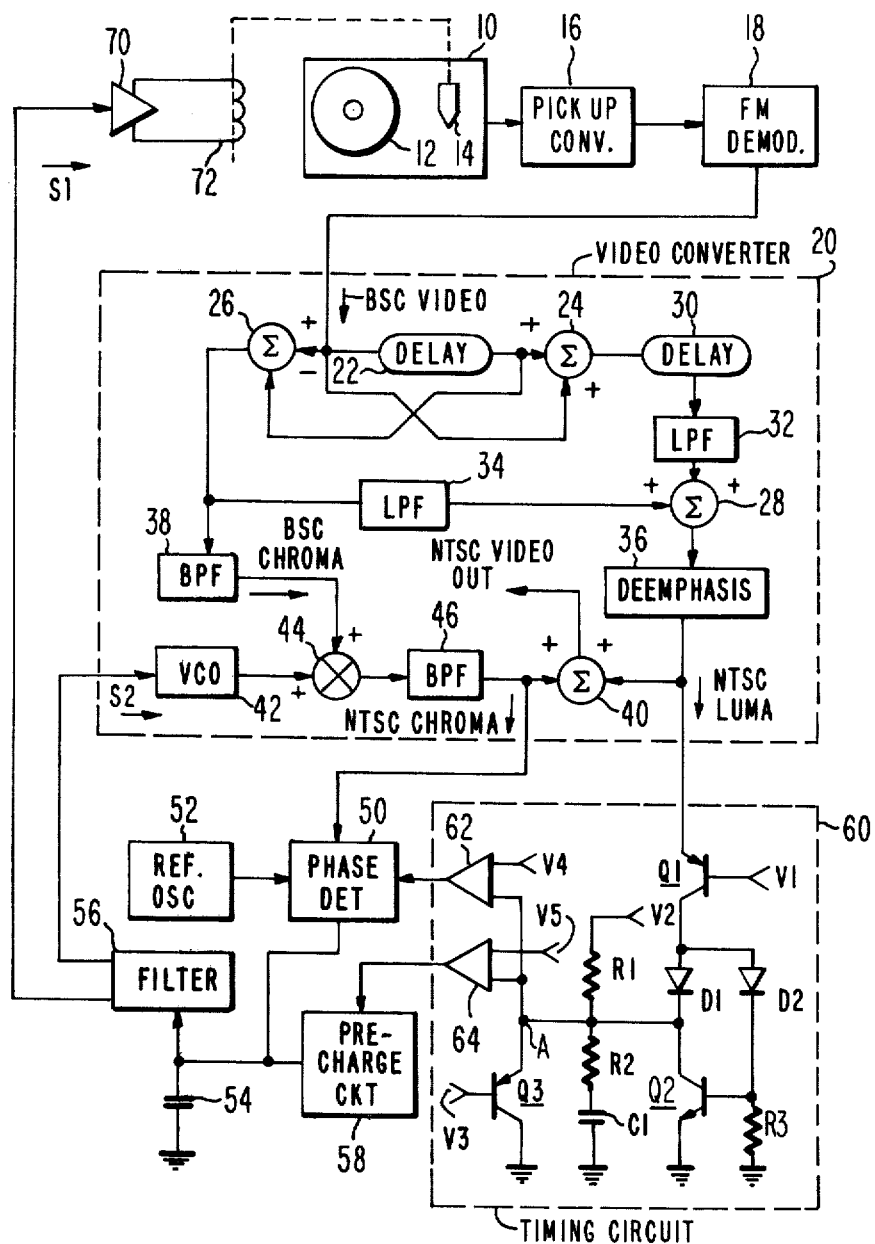

United States Patent [19]

Christopher et al.

[11] 4,286,282

[45] Aug. 25, 1981

[54] PERIODICALLY BIASED VIDEO DISC PLAYER SERVO SYSTEM

[75] Inventors: Todd J. Christopher; James A. Wilber, both of Indianapolis, Ind.

[73] Assignee: RCA Corporation, New York, N.Y.

[21] Appl. No.: 68,014

[22] Filed: Aug. 20, 1979

[51] Int. Cl.$^3$ ............................................. H04N 5/795
[52] U.S. Cl. .................................... 358/8; 358/128.6
[58] Field of Search ............... 358/4, 8, 128.5, 128.6; 360/36, 38; 179/100.3 Y, 100.1 G, 100.1 S

[56] References Cited

U.S. PATENT DOCUMENTS

| | | | |
|---|---|---|---|
| 3,614,305 | 10/1971 | Hidaka et al. | 358/8 X |
| 3,629,491 | 12/1971 | Dann et al. | 360/36 X |
| 3,873,764 | 3/1975 | Boltz, Jr. | 358/128.6 |
| 3,949,418 | 4/1976 | Srivastava | 358/20 |
| 3,965,482 | 6/1976 | Burrus | 358/8 |
| 3,974,520 | 8/1976 | Kuroyanagi | 358/8 X |
| 4,157,565 | 6/1979 | Kuniyoshi et al. | 358/8 |
| 4,196,445 | 4/1980 | Okada et al. | 358/8 |

Primary Examiner—Daryl W. Cook
Assistant Examiner—Donald McElheny, Jr.
Attorney, Agent, or Firm—E. M. Whitacre; J. S. Tripoli; R. G. Coalter

[57] ABSTRACT

Periodic biasing of video disc player signal correction servo to the center of its control range avoids the loss-of-loop gain which otherwise could occur if the servo were continuously biased and minimizes loop stabilization time. Periodic biasing is provided by means of a timing circuit, responsive to a luminance signal transition above blanking level, which enables the servo phase error detector and simultaneously enables a precharging circuit which charges the servo error voltage holding capacitor to a level corresponding to a zero error servo condition. The timing circuit disables the precharging circuit a predetermined time subsequent to an opposite transition of the luminance signal and disables the phase detector subsequent to disabling of the precharging circuit. The period between disabling of the precharging circuit and disabling of the phase detector encompasses the color burst interval of the horizontal sync pulse and may be controlled by selection of offset and slope parameters of an integrator in the timing circuit.

9 Claims, 2 Drawing Figures

PERIODICALLY BIASED VIDEO DISC PLAYER SERVO SYSTEM

This invention relates to video disc players and particularly to video signal correction servo systems for such players.

A video disc player which includes a video signal correction servo system is described in U.S. Pat. No. 3,965,482 entitled "VELOCITY CORRECTION CIRCUIT FOR VIDEO DISCS" which issued to T. W. Burrus, June 22, 1976. The Burrus player includes a turntable for rotating a video disc, a pickup transducer for sensing capacitance variations representative of information recorded on the disc in the "buried subcarrier" (BSC) format and an oscillator responsive to the capacitance variations for producing an FM output signal. The FM signal is then demodulated to produce a composite video signal which is converted from the BSC format to an NTSC format by means of a video converter.

An advantageous feature of the Burrus player is that errors in the disc-pickup relative velocity and errors in the chrominance frequency are corrected by means of a single two-loop servo system. It includes a color burst keyed phase detector which produces a composite error signal representative of phase and frequency errors between the output of an NTSC reference frequency crystal oscillator and the color burst component of the chrominance output signal produced by a video converter. A filter separates the composite error signal into two component error signals. One of the component error signals is applied to a stylus tangential position control transducer (known as an "arm stretcher") to form a principal feedback loop for minimizing velocity errors of the pickup stylus relative to the surface of the disc. By this means frequency errors in both the chrominance and luminance components of the composite video output signal (due, for example, to disc warpage or eccentricity) are minimized. The other component of the composite error signal is applied to a voltage controlled oscillator which forms part of a heterodyning circuit in the video converter. The auxiliary feedback loop thus formed (which is nested within the principal feedback loop) provides minimization of phase and frequency errors in the chrominance component of the composite video output signal.

It would be desirable in players of the general kind disclosed by Burrus to minimize the servo loop acquisition time in order that the user need only wait a minimal length of time after placing the player in a "play" mode of operation to obtain a satisfactory picture on an associated TV monitor. Acquisition time is also important during normal operation of the player since the servo loop (i.e. that which is phase locked with the chrominance burst signal) may suffer intermittent loss-of-lock due, for example, to record defects. Temporary loss-of-lock may also occur in a mode of operation where the user operates the player in a "scan" mode of operation in search of a particular selection on the disc.

As is generally known, servo system acquisition or stabilization time depends upon the loop filtering time constants. It would thus seem logical to merely decrease the servo loop filtering time constants in an effort to decrease the servo loop acquisition time. That approach, however, may not be practical in cases where the servo loop time constants are optimized to parameters of the record or dynamics of the player mechanical systems.

Another parameter one might consider changing is the servo loop gain. Generally, an increase in loop gain will result in a decrease in acquisition time but a limit is reached where problems with loop stability arise (high gain loops are generally more susceptable to oscillation or excessive "hunting" than lower gain loops).

A solution to the problem of acquisition time, which at first glance appears feasible, would be to apply bias to the servo system so that if loss-of-lock should occur the system will tend to "recenter" itself (i.e., assume a condition within the center of its normal operating range corresponding to a zero error condition) which represents an optimum condition for reacquisition to occur. Illustratively this could be done in the Burrus player by connecting a resistor between the color burst keyed phase detector output and a source of reference voltage corresponding to the servo "zero error" voltage. One problem with such an approach is that the loading due to the resistor could decrease the servo loop gain. A more serious problem is that the resistor might actually cause loss-of-phase lock under certain conditions by providing a discharge path for the servo error voltage holding capacitor that stores the burst keyed phase detector output voltage between color burst intervals.

The present invention is directed to meeting the need for a video disc player in which the player video signal correction servo stabilization time is substantially reduced and which avoids the aforementioned problems of loop gain reduction and interference with normal operation of the servo.

The present invention is particularly applicable to the video disc players of the kind including a video signal correction servo comprising a reference oscillator for producing a reference signal, a phase detector responsive to an enabling signal for comparing the reference signal with a video signal produced by said player, a holding capacitor for storing said error voltage and a feedback path for applying said error voltage to a point in said player in a sense to minimize errors between the reference and video signals.

In accordance with one aspect of the invention, circuitry is provided for periodically biasing the servo system to a predetermined point in its control range.

In accordance with another aspect of the invention the periodic biasing is provided by a precharging circuit responsive when enabled for charging said capacitor to a predetermined voltage level and a timing circuit for enabling said phase detector and said precharging circuit during a first time interval, for enabling said phase detector and disabling said precharging circuit during a second time interval and for disabling said phase detector and said precharging circuit during a third time interval.

In accordance with a further aspect of the invention the first and second time intervals are controlled by selection of parameters which control an offset voltage level and the slope of an integrator in the timing circuit.

Figure 2:
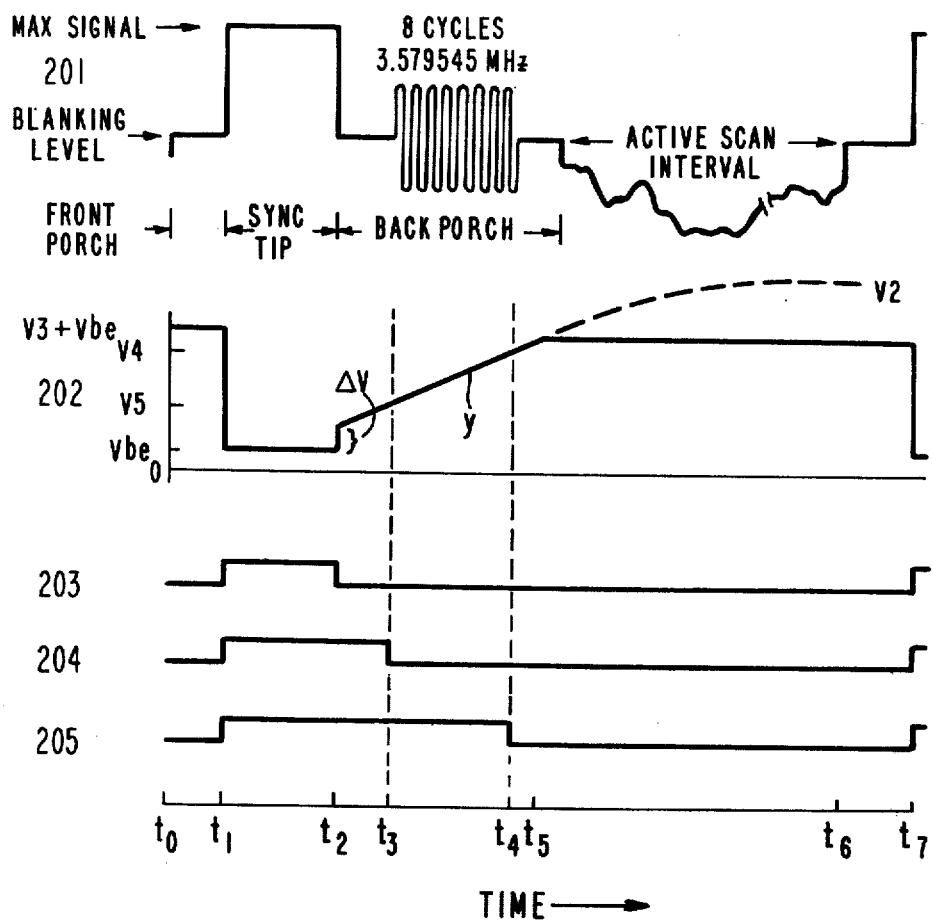

The above features and further aspects of the invention are presented in detail in the following description and drawings wherein like reference numbers designate like reference elements and in which:

FIG. 1 is a block diagram, partially in schematic form, of a video disc player embodying the invention; and FIG. 2 is a diagram illustrating signal waveforms and timing relationships for the player of FIG. 1.

The video disc player in FIG. 1 comprises a turntable 10 for rotating video disc 12 and a pickup transducer 14 for recovering information signals from the disc. Illustratively, it will be assumed that the player is intended for use with records in which information is stored in the form of topological variations and recovered by sensing capacitance variations between pickup transducer 14 and the record 12. The output of transducer 14 is coupled to the input of a pickup converter circuit 16 which comprises a capacitance-to-voltage converter responsive to capacitance variations between a stylus in transducer 14 and the record being played for producing an FM output signal voltage representative of the recorded information. Such records and suitable circuits for implementing the capacitance-to-voltage conversion function of pickup circuit 16 are well known. See, for example, U.S. Pat. No. 3,783,196 entitled "High-Density Capacitive Information Records And Playback Apparatus Therefor" which issued to T. O. Stanley, Jan. 1, 1974; U.S. Pat. No. 3,972,064 entitled "Apparatus And Methods For Playback Of Color Pictures/Sound Records" which issued to E. O. Keizer, July 27, 1976; and U.S. Pat. No. 3,711,641 entitled "Velocity Adjusting System" which issued to R. C. Palmer, Jan. 16, 1973.

Video FM demodulator circuit 18 converts the FM signal produced by pickup circuit 16 to a video output signal. For purposes of illustrating certain features of the invention, it will be assumed that the video signals recorded on the disc are in the previously mentioned "buried subcarrier" (BSC) format rather than the conventional NTSC format. As is known (see, for example, U.S. Pat. No. 3,872,498 entitled "Color Information Translating Systems", which issued to D. H. Pritchard, Mar. 18, 1975), in the BSC format, chrominance information is represented by a color subcarrier of the general form employed in the well-known NTSC format. However, the chrominance component in the BSC format is not located in the high end of the luminance signal video band, as in NTSC, but rather is buried in a lower portion of the video band. An illustrative subcarrier frequency choice is in the vicinity of 1.53 MHz, with the color subcarrier side bands extending ±500 KHz thereabout and, with the luminance signal band extending well above the highest color subcarrier frequency (to 3 MHz, for example).

FM demodulator 18 illustratively may be of the pulse counting type or of the phase-lock-loop (PLL) type. A suitable pulse counting type FM demodulator is disclosed in U.S. Pat. No. 4,038,686 entitled "Defect Detection And Compensation" which issued to A. L. Baker, July 26, 1977. An FM demodulator of the phase lock loop type is described in U.S. patent application, Ser. No. 948,013 of T. J. Christopher et al. entitled "FM Signal Demodulator With Defect Detection" which was filed Oct. 2, 1978, and issued as U.S. Pat. No. 4,203,134 on May 13, 1980.

The composite video signal produced by FM demodulator 18 is converted from the BSC format to an NTSC format by video converter 20 (outlined in phantom). The BSC video signal is supplied to the input of delay line 22 and is summed with the output of delay line 22 by means of summation circuit 24 to thereby form a comb filter which separates the luminance component from the composite color video signal. The delay of delay line 22 is selected such that the luminance comb filter has frequency response characterized by multiple response peaks falling at even integral multiples at half the nominal horizontal line frequency and multiple rejection notches falling at odd integral multiples of half the nominal line frequency. Illustratively, a suitable delay would be equivalent to one horizontal scan interval.

The output of delay line 22 is subtracted from the BSC video signal by subtraction circuit 26 to thereby form another comb filter which passes the chrominance component of the composite video signal. This chrominance comb filter has a frequency response characteristic having multiple peaks falling at odd integral multiples of half the nominal horizontal line frequency and multiple rejection notches falling at even integral multiples of half the normal line frequency.

Delay line 22 may be a conventional LC delay line, an acoustic delay line or preferably may be of a charge couple device (CCD) type. (See for example, the article by J. Matob, entitled "Charge Couple Device" which appeared in the January, 1975 issue of Wireless World). Further advantages and examples of comb filtering and video format conversion may be found in: U.S. Pat. No. 3,872,498 entitled "Color Information Translating System" which issued to D. H. Pritchard, Mar. 18, 1975; U.S. Pat. No. 3,996,610 entitled "Comb Filter Apparatus For Video Playback Systems" which issued to H. Kawamoto, Dec. 7, 1976 and the U.S. patent application of T. J. Christopher and L. L. Tretter entitled "Video Processing System including Comb Filters" Ser. No. 966,512 which was filed Dec. 4, 1978, and issued as U.S. Pat. No. 4,195,309 on Mar. 25, 1980.

Since the frequency range of the luminance signal component in the BSC format is substantially the same as in the NTSC format, all that remains to provide a proper NTSC luminance output signal is to compensate for preemphasis which was performed in the recording process and to supplement the signal with information relating to vertical detail. Supplementation is provided by coupling the output of summation circuit 24 to one input of a further summation circuit 28 via a cascade connection of delay element 30 and a low-pass filter 32 and coupling the output of subtraction circuit 26 to the other input of summation circuit 28 via a low-pass filter 34. Suitable design parameters for the coupling elements would be: a delay of about 500 nSec for delay element 30 (this compensates for the delay through low-pass filter 34); a pass-band of 0–5 MHz for low-pass filter 32; and a pass band of 0–500kHz for low-pass filter 34. Compensation for preemphasis is provided by coupling the output of summation circuit 28 to the input of deemphasis circuit 36 which preferably has a transfer characteristic complementary to that of the preemphasis circuit used in the recording process.

The output of subtraction circuit 26 contains both low frequency information (which is passed by low-pass filter 34 for supplementing vertical detail of the luminance signal as previously mentioned) and the chrominance signal in BSC format. The low frequency information is rejected by connecting the output of subtraction circuit 26 to the input of band-pass filter 38 which preferably has a pass band of about 1 MHz centered at the BSC frequency of nominally 1.53 MHz.

Since the frequency range of the chrominance signal in the BSC format (nominally 1.53 MHz) is lower than its range in the NTSC format (nominally 3.58 MHz), up-conversion of the output signal of band-pass filter 38 is necessary before the chrominance and luminance signals may be added (in summation circuit 40) to produce an NTSC composite video signal. This frequency translation is provided by voltage controlled oscillator (VCO) 42, multiplier 44 and band-pass filter 46. The output frequency of VCO 42 (when at the center of its control range) is nominally 5.11 MHz. Accordingly, multiplier 44, which mixes or multiplies the BSC chrominance signal produced at the output of bandpass filter 38 with the output of VCO 42, produces output signals of nominally 3.58 and 6.64 MHz. Band-pass filter 46 passes the lower frequency signal (which corresponds to the NTSC chrominance signal standard) to summation circuit 40 where it is summed with the NTSC luminance signal produced at the output of deemphasis circuit 36 to thereby provide a composite video output signal in the NTSC format from the video disc player.

Multiplier 44 and band-pass filter 46 may be of conventional design. It is desirable, however, that VCO 42 feature high stability and be capable of wide frequency deviation. A preferred voltage controlled oscillator having a wide deviation range, is disclosed in the U.S. patent application of T. J. Christopher and J. Wilber entitled "Variable Frequency Oscillator", Ser. No. 51826 which was filed June 25, 1979.

The remaining elements of FIG. 1 comprise a video signal correction servo system which detects errors in the video signal produced by the player and supplies feedback signals to appropriate points in the player in a sense to minimize those errors. Error detection is provided by means of phase detector 50 which, when enabled by a timing or keying signal produced by timing circuit 60, compares the frequency and phase of the color burst component of the chrominance signal produced at the output of bandpass filter 46 with the standard NTSC reference frequency (3.579545 MHz) produced by a reference oscillator 52 and supplies an error voltage to holding capacitor 54. Capacitor 54, as will be explained in more detail subsequently, stores the error voltage during the so-called "active scan" interval immediately following the color burst interval (during which time detector 50 is disabled).

Error correction is provided by means of filter 56 which converts the error voltage produced by phase detector 50 into a pair of component error signals S1 and S2. The component S1 is applied via driver amplifier 70 to arm stretcher transducer 72 for providing stylus-disc relative velocity error correction. Transducer 72 is mechanically coupled to the player pickup transducer 14 for controlling the tangential position of the pickup stylus relative to the video information track recorded on the video disc 12. If the disc is out-of-round, for example, transducer 72 changes the effective length of the pickup arm in consonance with rotation of the disc in a sense to compensate for its eccentricity. Arm stretcher transducers suitable for performing this function are described, for example, in U.S. Pat. No. 3,882,267 entitled "Video Playback System Tracking Arm And Pickup Assembly" which issued to M. A. Leedom, May 6, 1975 and U.S. Pat. No. 3,983,318 entitled "Velocity Correction System With Damping Means" which issued to M. E. Miller and J. G. Amery, Sept. 28, 1976.

The component S2 is applied to VCO 42 in video converter 20 in a sense to minimize frequency and phase errors in the chrominance component of the NTSC composite video output signal. Component S2 comprises a low frequency component and a broad-band component. The low frequency component (e.g. less than 1 Hz) provides correction for very low frequency errors as might be caused, for example, by power line frequency fluxuations influencing the turntable rotational velocity. The broad-band component of S2 provides correction for relatively high frequency errors due, for example, to spurious variations in the recovered video signal.

A suitable design for filter 56 is disclosed in the previously mentioned Burrus patent. There, the component error signal S1 is obtained by filtering the phase detector output with an active low-pass filter having a corner frequency selected to equal the turntable "once-around" velocity (e.g., 7.5 Hz for a turntable rotational velocity of 450 RPM). The component error signal S2 is obtained by means of cascade connected passive low-pass filter having a corner frequency substantially less than the "once-around" frequency (Burrus suggests 0.27 Hz) and summing the output of the passive filter (the low frequency component of S2) with an unfiltered signal from the phase detector (i.e., the broad band component of S2). A preferred implementation of filter 56 in which both of the low-pass filters are active filters and which includes transient detection and suppression circuitry is described in a copending allowed U.S. patent application of J. A. Wilber and T. J. Christopher entitled "Nested Loop Video Disc Servo System" Ser. No. 074,515, filed Sept. 11, 1979.

A precharging circuit 58 is coupled to holding capacitor 54 for periodically precharging capacitor 54 to a predetermined voltage level. Illustratively, circuit 58 may comprise a transmission gate or switch connected between capacitor 58 and a source of voltage equal to the servo system "zero error" voltage. As used herein "zero error" voltage means the value of voltage on capacitor 54 which would tend to place transducer 72 in the center of its normal operating range and which would tend to place the output of VCO 42 at its center frequency of nominally 5.11 MHz.

Timing circuit 60 provides keying or enabling control signals to phase detector 50 and precharging circuit 58 and is synchronized with a component of the NTSC luminance signal produced at the output of deemphasis circuit 36. Circuit 60 comprises a common base operated sync tip detector transistor Q1 connected at its emitter to receive the NTSC luminance signal from deemphasis circuit 36 and at its base to a source of reference voltage V1. The collector of transistor Q1 is coupled via a pair of anti-saturation diodes D1 and D2 to the collector and base, respectively, of grounded emitter ramp clamp transistor Q2 the base of which is coupled to ground via turn-off bias resistor R3.

The collector of transistor Q2 is connected to input-output node A of a variable-slope variable-offset ramp generator comprising slope control resistor R1, offset control resistor R2 and integrator capacitor C1. Resistor R1 is connected between a source of reference voltage V2 and node A. Resistor R2 and capacitor C1 are connected in series between node A and ground (the order of the series connection may be reversed if desired).

Input-output node A is coupled to the emitter of ramp limiter transistor Q3 which is operated as a common base limiter by applying a reference voltage V3 to its base electrode and grounding its collector electrode. Node A is also coupled to comparator 62 which supplies an enabling or keying signal to phase detector 50 when the node A voltage is less than a reference level V4 applied to its other input. Enabling or precharging circuit 58 is provided by comparator 64 which compares the node A voltage with a reference level V5.

Reviewing briefly the general player operation, when a record is being played pickup transducer 14 which is proximate to the surface of the record produces capacitance variations representative of information recorded on the record as a carrier FM modulated by a video signal in BSC format. Pickup converter circuit 16 responds to the capacitance variations to produce an output voltage signal which is demodulated by FM demodulator 18 to produce a BSC composite video signal. Video converter 20 converts the BSC signal to NTSC format as previously explained. Phase detector 50, keyed during the color burst interval by timing circuit 60, produces a composite error signal representative of phase and frequency errors between the output of NTSC reference oscillator 52 and the color burst component of the NTSC chrominance signal produced by video converter 20. The composite error signal is supplied to error voltage holding capacitor 54 which stores it during the active scan interval of each horizontal sweep period. Filter 56 separates the composite error signal into two components S1 and S2. Arm stretcher transducer 72, coupled to transducer 14, responds to the component S1 and varies the position of pickup transducer 14 in a sense to minimize velocity errors and thus errors in both the chrominance and luminance components of the composite video output signal produced by converter 20. Voltage controlled oscillator 42 in converter 20 responds to the component error signal S2 for providing further correction of frequency and phase errors of the chrominance component of the NTSC composite video output signal.

The detailed operation of phase detector 50, precharging circuit 54 and timing circuit 60 will now be discussed with reference to the waveforms of FIG. 2. Waveform 201 is illustrative of the NTSC composite video output signal produced at the output of summing circuit 40 during one horizontal scan interval. Waveform 202 illustrates the node A voltage. Waveform 203 illustrates the sync detector (Q1) output signal (a high level signifies collector current flow). Waveforms 204 and 205 represent output signals produced by comparators 64 and 62, respectively (for each, a high level signifies an enabling output signal level and a low level signifies an inhibiting output signal level).

At time $t_1$ the composite video signal level (waveform 201) makes a transition from blanking level to a maximum level and subsequently (time $t_2$) makes an opposite transition back to blanking level. The time interval $t_1-t_2$ corresponds to the sync tip interval of the composite video signal (about 4.7 uSec in the NTSC standard) and is detected by sync separator transistor Q1 to synchronize timing circuit 60. Detection is provided by selection of a value of the reference voltage V1 to be intermediate the blanking and maximum signal level voltages of the NTSC luminance signal (not shown) produced at the output of deemphasis circuit 36. Since the luminance signal is applied to the emitter of Q1 its base emitter junction is forward biased and collector current flows throughout the sync tip interval as illustrated by waveform 203.

Synchronization of timing circuit 60 by detection of the sync tip interval of the luminance signal rather than the composite signal provides the dual advantages of (1) preventing false detection or triggering of sync separator transistor Q1 and (2) eliminating the need for precise adjustment or regulation of the voltage V1. To illustrate, assume that the emitter of Q1 were connected to the output of summation circuit 40. To reliably detect the sync tip it would be necessary to select V1 to be intermediate the peak of the color burst signal and the sync tip otherwise Q1 could be falsely triggered during the color burst interval by the color burst signal (the peak of the burst is typically half the sync tip height). This possible difficulty is avoided by applying the luminance component of the video output signal to the emitter of transistor Q1 since the color burst is effectively removed from the luminance signal by comb filtering.

A further advantage of the synchronization circuit of the present invention is that it may be constructed in integrated form. All that is needed is a suitable biased common base connected transistor or some other form of comparator. Contrast this with the sync detection circuitry in television receivers which typically utilize a "ringing" or resonant circuit to prevent color burst interference with sync detection. The disadvantages of such an approach are that the resonant circuits require inductors and capacitors which are bulky, expensive and not practical elements for integrated circuit construction.

Ramp clamp transistor Q2 is turned on during the sync tip interval $t_1-t_2$ in response to the collector current provided by transistor Q1 and discharges integrator capacitor C1 to a voltage level of about one semiconductor junction voltage drop ($V_{be}$ in waveform 202). This results because anti-saturation diodes D1 and D2 tend to equalize the collector and base voltages of transistor Q2 thereby preventing saturation and enhancing its recovery (turn-off) time. This represents a feature of the invention which assures that the time intervals generated by timing circuit 60 are not dependent on the saturation storage time of Q2 (storage time is a variable and relatively unpredictable parameter).

Resistor R3 provides the dual function of aiding in preventing saturation of Q2 and enhancing its turn-off time. Recall that diodes D1 and D2 tend to equalize the collector and base voltages of Q2. Equalization will be exact if the diodes are of the same junction area and carry the same current level. Without resistor R3 the current level in diode D1 (after discharging capacitor C1) would be greater than that in diode D2 by a factor equal to the d.c. common emitter current gain of Q2 ($h_{FE}$ in hybrid parameter notation). One thus has two choices to prevent the collector voltage of Q1 from being less than its base voltage. One could, for example, select the ratio of the junction ares of D1 and D2 to equal $h_{FE}$. The disadvantage of that approach however, is that one diode would be very large compared with the other. The other choice, as shown, of connecting resistor R3 across the base-emitter junction of Q2 provides additional current to diode D2 allowing the ratio of junction areas to be smaller (unity, for example). Turnoff time is further enhanced by R3 because it provides turn-off bias to the base of Q2 when transistor Q1 turns off.

At time t2, when transistors Q1 and Q2 turn off, a step in the node A voltage (waveform 202) occurs. The amplitude of this step, $\Delta V$, is a controllable parameter and represents a constant offset voltage which is added to the integrator capacitor voltage to produce a ramp voltage, y, which may be calculated from the equation:

$$y = mX + \Delta V + b \tag{1}$$

wherein:
y is the node A voltage,
m is the rate of change of capacitor C1 voltage, x is time,
b is the initial C1 voltage and
ΔV is the offset (step) voltage.

It is a feature of the invention that the timing of signals supplied to phase detector 50 and precharge circuit 58 may be controlled by selection of the ramp slope, m, and offset voltage ΔV, and these parameters may be independently controlled. As will be explained subsequently the slope m, controls the width of the phase lock "window" (the interval t3–t4) and the offset, ΔV, controls the position of the window along the back porch (t2–t5) of the horizontal synchronizing signal.

In more detail, at time t2 when transistors Q1 and Q2 turn-off capacitor C1 will be charged to a voltage level of $V_{be}$ volts (term b in equation 1). The voltage on capacitor C1 will begin immediately to change at an initial rate, m, proportional to the value of C1 and the charging current supplied to it. By selecting the value of resistor R1 to be very much greater than that of resistor R2 (or by replacing resistor R1 with a constant current source) the charging current and thus the slope m, can be made independent of the value of resistor R2. Since the charging current flows through resistor R2, however, an offset voltage ΔV is produced thereacross and since resistor R2 is in series with capacitor C1 the offset voltage is added to the capacitor voltage. Thus, for a given charging current which determines the ramp slope and window width the value of resistor R2 may be varied independently to control the ramp offset and thus the window position.

During the interval t2–t5 the node A voltage increases linearly to a limiting value equal to the sum of reference voltage V3 plus $V_{be}$ of ramp limiter transistor Q3 at which time transistor Q3 turns on to prevent any further increase. Transistor Q3 then remains on for the remainder (t5–t7) of the horizontal interval. The dashed extension of the ramp voltage of waveform 202 illustrates that without limiting the ramp voltage would asymptotically approach the reference voltage V2. Limiting of the ramp voltage to a predetermined value provides advantages in that (1) it shortens the length of time required for transistor Q2 to discharge C1 and (2) it limits the peak collector current flow and base current drive requirements of transistor Q2.

Waveform 204 represents the control signal supplied to precharging circuit 58 by comparator 64 which compares the node A voltage with the reference voltage V5. During the interval t1–t3 the ramp voltage is less than V5 and comparator 64 supplies an enabling signal to precharging circuit 58. When the ramp voltage exceeds V5, comparator 58 terminates the precharging circuit enabling signal (t3–t7).

Waveform 205 represents the control signal supplied to phase detector 50 by comparator 62 which compares the node A voltage with the reference voltage V4 (V4, as shown, is more positive than V5). During the time interval t1–t4 the ramp voltage is less than V4 and comparator 62 supplies an enabling signal to phase detector 50. When the ramp voltage exceeds V4 comparator 62 terminates the phase detector enabling signal.

It will be noted that precharging circuit 58 and phase detector 50 are both enabled during the time interval t1–t3. This is not essential and one could delay turn-on of phase detector 50 until time t3. That could be done, for example, by suitable gating or control circuitry for inhibiting the output of comparator 62 during the interval t1–t3 when comparator 64 is supplying an enabling signal to pre-charging circuit 58. Such a change, however, would require additional circuitry thus increasing the cost and complexity of timing signal generation.

During the interval t1–t3, when precharging circuit 58 is enabled, error voltage holding capacitor 54 is precharged to a voltage level corresponding to the center of the servo system dynamic range. If loss-of-phase lock should occur the absences of coherent or consistent signals from phase detector 50 coupled with the repeated biasing will ultimately tend to recenter arm stretcher transducer 72 and place VCO 42 at the center of its control range (5.11MHz). This, as previously explained, is the optimum condition for reacquisition of phase lock to occur. If, on the other hand, the servo is in a phase locked condition the precharging of capacitor 54 will have little effect because the rate of precharging (once each scan interval) is very much higher than the cut-off frequencies of filter 56 while the rate of change of the phase detector output voltage (viewed on a line-to-line basis) is well within the filter bandwidth.

What is claimed is:

1. In a video disc player of the kind including a video signal correction servo system comprising a reference oscillator for producing a reference signal, phase detector means responsive when enabled for comparing said reference signal with a first component of a video signal produced by said player and for providing an error voltage in response to said comparison and, a feedback path for applying said error voltage to a point in said player in a sense to minimize errors between said reference signal and said first component of said video signal, the improvement for periodically biasing said servo system to a predetermined point in its control range, comprising:

holding capacitor means for holding said error voltage;

precharging circuit means responsive when enabled for charging said holding capacitor means to a predetermined voltage level; and timing circuit means synchronized with a second component of said video signal for enabling said phase detector means and said precharging circuit means during a first time interval, for enabling said phase detector means and disabling said precharging circuit means during a second time interval and for disabling said phase detector means and said precharging circuit means during a third time interval.

2. A video disc player as recited in claim 1 wherein said timing circuit means comprises:

ramp generator means for producing a ramp voltage;

means for resetting said ramp generator means during said first time interval;

first means responsive to said ramp voltage for supplying an enabling signal to said precharging circuit means when said ramp voltage is within a range defined by first and second values; and second means responsive to said ramp voltage for supplying an enabling signal to said phase detector means when said ramp voltage is within a range defined by said first value and a third value, said third value being greater in a given sense than said second value.

3. A video disc player as recited in claim 2 wherein said ramp generator means comprises:

an integrating capacitor for integrating a current supplied thereto;

a source of offset voltage; and means for summing said offset voltage with a voltage produced across said integrating capacitor.

4. A video disc player as recited in claim 2 further comprising means for limiting the magnitude of said ramp voltage to a predetermined value.

5. In a video disc player of the kind including a video signal correction servo system comprising a reference oscillator for producing a reference signal, a phase detector responsive to an enabling signal for comparing said reference signal with a color burst component of a video signal produced by said player and producing an error voltage representative of deviations of said color burst component from a prescribed relationsip with said reference signal, an error voltage holding capacitor for storing said error voltage during a portion of each horizontal scan interval of said video signal, a feedback path for supplying said error voltage to at least one point in said player in a sense to minimize said deviations, the improvement for periodically biasing said video signal correction servo system to a predetermined point within its control range, said improvement comprising:
- a precharging circuit means coupled to said error voltage holding capacitor and responsive to a control signal for charging said error voltage holding capacitor to a predetermined voltage level when said control signal is present; and
- a timing circuit means synchronized with a horizontal synchronizing signal derived from said video signal for supplying said enabling signal to said phase detector and simultaneously supplying said control signal to said precharging circuit means during a first time interval, for supplying said enabling signal to said phase detector and simultaneously terminating said control signal during a second time interval subsequent to said first time interval and for terminating both said enabling signal and said control signal during a third time interval subsequent to said second time interval.

6. A video disc player as recited in claim 5 wherein said timing circuit means comprises:
- ramp generator means for producing a ramp voltage;
- reset circuit means coupled to said ramp generator means and responsive to said horizontal synchronizing signal for periodically resetting said ramp generator means;
- first comparator means for comparing said ramp voltage with a first reference voltage and supplying said control signal to said precharging circuit means when said ramp voltage is less than said first reference voltage; and
- second comparator means for comparing said ramp voltage with a second reference voltage and supplying said enabling signal to said phase detector when said ramp voltage is less than said second reference voltage, the magnitude of said second reference voltage being greater than that of said first reference voltage.

7. A video disc player as recited in claim 6 wherein said ramp generator means comprises:

a capacitor;
first means for supplying a current to said capacitor of predetermined value for determining the slope of said ramp voltage; and
second means for adding an offset voltage to the voltage produced across said capacitor.

8. A video disc player as recited in claim 7 wherein said ramp generator means further comprises a node at which said ramp voltage is produced, said first means comprises a current source coupled to said node and said second means comprises a resistor, said resistor and said capacitor being connected in series between said node and a point of fixed potential.

9. In a video disc player of the kind comprising a turntable for rotating a video disc, a pickup transducer proximate said disc for producing capacitance variations representative of information recorded on said disc as a frequency modulated carrier in BSC format, a pickup converter responsive to said capacitance variations for producing a voltage output signal, a demodulator for demodulating said FM output signal to produce a composite video signal, a video converter for converting said composite video signal from said BSC format to an NTSC format, a phase detector responsive to a keying signal for producing a composite error signal representative of phase and frequency errors between the output signal of an NTSC reference frequency crystal oscillator and the color burst component of an NTSC chrominance output signal produced by said video converter, an error voltage holding capacitor for storing said composite error signal, a filter for separating the composite error signal into first and second components, an arm stretcher transducer responsive to said first component and coupled to said pickup transducer for varying the position of said pickup transducer in a sense to minimize frequency errors in both the chrominance and luminance components of said composite video output signal produced by said video converter and a voltage controlled crystal oscillator in said video converter responsive to said second component of said composite error signal for correcting phase and frequency errors of solely the chrominance component of said NTSC composite video output signal, the improvement, comprising:
- a precharging circuit means coupled to said error voltage holding capacitor and responsive to a control signal for charging said error voltage holding capacitor to a predetermined voltage level when said control signal is present; and
- a timing circuit means synchronized with the tip of a horizontal synchronizing pulse derived from said video converter for supplying said keying signal to said phase detector during first and second time intervals and terminating said keying signal during a third time interval, said timing circuit means supplying said control signal to said precharging circuit means during said first time interval and terminating said control signal during said second and third time intervals.

* * * * *